United States Patent
Chhaya et al.

(10) Patent No.: US 8,306,031 B2
(45) Date of Patent: *Nov. 6, 2012

(54) ADAPTIVE BLOCK SEQUENCE ARQ PROTOCOL FOR WIRELESS COMMUNICATIONS

(75) Inventors: Harshal S. Chhaya, Plano, TX (US); Ramanuja Vedantham, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 763 days.

This patent is subject to a terminal disclaimer.

(21) Appl. No.: 12/201,644

(22) Filed: Aug. 29, 2008

(65) Prior Publication Data

US 2010/0054181 A1 Mar. 4, 2010

(51) Int. Cl.
*H04L 12/56* (2006.01)
(52) U.S. Cl. ........ 370/394; 370/328; 714/746; 714/747; 714/748; 714/749; 714/750; 714/751
(58) Field of Classification Search .................. 370/328, 370/394; 714/746–751
See application file for complete search history.

(56) References Cited

U.S. PATENT DOCUMENTS

| 7,752,519 | B2 * | 7/2010 | Yeo et al. ....................... 714/748 |
| 2007/0277073 | A1 * | 11/2007 | Zegers et al. .................. 714/748 |
| 2007/0277074 | A1 * | 11/2007 | Yeo et al. ....................... 714/749 |
| 2009/0150737 | A1 * | 6/2009 | Wang et al. .................... 714/748 |
| 2010/0192034 | A1 * | 7/2010 | Chhaya et al. ................. 714/748 |

* cited by examiner

*Primary Examiner* — Christopher Grey
(74) *Attorney, Agent, or Firm* — Alan A. R. Cooper; Steven A. Shaw; Frederick J. Telecky, Jr.

(57) ABSTRACT

A method of performing wireless communications. The method receives at a receiving unit a sequence of data blocks from a transmitting unit. The method also identifies at the receiving unit a first number of invalid sequential data blocks in the sequence and a second number of valid sequential data blocks in the sequence. The method also communicates from the receiving unit a wireless message to the transmitting unit. The wireless message comprises a first field that specifies the first number and a second field that specifies the second number—the encoding of the first field is operable to specify a different maximum than an encoding of the second field.

25 Claims, 3 Drawing Sheets

ADAPTIVE BLOCK SEQUENCE ARQ PROTOCOL FOR WIRELESS COMMUNICATIONS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The preferred embodiments are in the field of wireless communications and are more specifically directed to automatic repeat requests from a receiving unit to indicate to a transmitting unit to re-transmit a number of data blocks that were not properly received by the receiving unit.

Advances in wireless communication technology, especially in recent years, have greatly improved not only the performance (i.e., data rate for a given error rate) at which wireless communications can be carried out, but also have enabled the realization of additional functions and services by way of wireless communications. For example, wireless broadband communication in metro area networks is now becoming commonplace. An example of one type of wider area wireless network communications is referred to as "WiMAX", corresponding to communications carried out under IEEE Standard for Local and metropolitan area networks, Part 16: Air Interface for Fixed Broadband Wireless Access Systems (IEEE Standard 802.16-2004, and all subsequent revisions). Of course, wireless local area networks (WLAN) are also now becoming commonplace and are capable of carrying traffic at very high data rates (e.g., 100 Mbit/sec).

Networks operating under the WiMAX standard, for example, are capable of carrying out multiple types of communications. These multiple communications "services" are typically supported by modern wireless devices, including laptop computers equipped with WiMAX network adapters, palm top computers or highly capable personal digital assistants (PDAs), and modern "smartphones" that support data services. As known in the art, these modern wireless devices and systems, communicating via a WiMAX or other metro or wider area wireless network, support multiple simultaneous wireless communications sessions. Different types of such communications can have different constraints and requirements. For example, one class of such communications that can be carried out under WiMAX is voice telephony, by way of the well-known Voice over Internet Protocol (VoIP) service. VoIP communications involve constraints on the timeliness of the communications (i.e., so that a sensible back-and-forth conversation can be carried out), but can tolerate a relatively high error rate. In contrast, email services, and web browsing services over the Internet, involve less stringent time constraints, but can have higher error rate requirements.

Physically, a WiMAX metro area network is realized via base stations deployed within the physical service area with some frequency (e.g., on the order of a base station deployed every mile, to every several miles), similar to cellular telephone base stations and towers. A given base station is capable of communicating with nearby wireless client devices, typically referred to as "subscriber stations", or often as "mobile stations" considering that these devices are typically portable computing and communications devices such as laptop or palmtop computers, smartphones, and the like. Each of the traffic flows between a mobile station and a base station is typically referred to as a "service flow", in the context of WiMAX communications. For example, a VoIP call is carried out over one service flow, an email session is carried out over another service flow, and each web browsing session is carried out over another service flow. As evident from this discussion, multiple service flows may be carried out simultaneously between a mobile station and a base station; indeed, communications in each direction (e.g., uplink and downlink) are typically considered a separate service flows, such that bidirectional communications in an interactive web session, for example, typically constitutes two service flows.

Various communications standards include and define an automatic repeat request (ARQ) sub-protocol under which a receiving station, after receiving a sequence of blocks (or "packets") of data, provides feedback to the transmitting station if blocks of that data were not properly received. Thus, in a given service flow, the receiving station provides feedback to the transmitting station, and from the above discussion of service flows note that for a given service flow, the receiving station may be the base station while the transmitting station is the mobile station, or conversely for a given service flow, the receiving station may be the mobile station while the transmitting station is the base station. In any event, the ARQ feedback specifies, for erroneous or lost data blocks, various message formats for the feedback messages that when received by the transmitting station, cause that station to re-transmit the improperly received (or lost) data blocks. Thus, by way of example but without limitation to the preferred embodiments detailed later, for conventional communications under the IEEE 802.16 standard, there are four different types of ARQ formats: (i) Selective ACK; (ii) Cumulative ACK; (iii) Cumulative with Selective ACK; and (iv) Cumulative ACK with Block Sequence ACK. Each of these is known in the art, but each is also described below for sake of background and with respect to Cumulative ACK with Block Sequence Ack for sake of contrast to the preferred embodiments detailed later.

In the Selective ACK ARQ format, a receiving station transmits a feedback message to a transmitting station that includes one or more (up to four) 16-bit bitmaps, where each bit in the bitmap corresponds to a respective block of data received by the receiving station and indicates, by the binary map value, whether the block was received either acceptably or in error. For example, if the binary value of 1 indicates an acceptable data block, then the binary value of 0 indicates an unacceptable (i.e., in error) data block, where at least the latter therefore is to be re-transmitted by the transmitting station once it receives and comprehends the feedback ARQ message. Using these conventions and by way of example, therefore, a 16-bit Selective ACK bitmap of 1111000011110000 indicates from the receiving station to the transmitting station that in the 16 blocks of data it received, the first set of four data blocks was acceptable, the second set of four data blocks was in error, the third set of four data blocks was acceptable, and the fourth set of four data blocks was in error. Thus, in response to the message, the transmitting station may re-transit the erroneous data blocks (i.e., the second and fourth set of blocks). Note that the Selective ACK ARQ format has at least one drawback in that it expects the transmitter and receiver windows to be synchronized. The 'Cumulative with Selective ACK' format (described below) avoids this problem.

In the Cumulative ACK ARQ format, a receiving station transmits a feedback message to a transmitting station that includes an identifier (e.g., sequence number) of the last data block that was satisfactorily received in a sequence of blocks. Thus, in response to the message, the transmitting station may re-transmit the sequence starting from the next block following the identified-erroneous received data block. Note that the Cumulative ACK ARQ format has at least one drawback if used in sequences that include a burst of erroneously-received data blocks in the middle of otherwise properly received data blocks. More specifically, then, consider the use of the Cumulative ACK ARQ format in a case for a sequence of 100 blocks, where the first 10 blocks are received accurately, the next 5 blocks are received in error, and the remaining 85 blocks are received accurately; in this case, then the Cumulative ACK ARQ would indicate the last error-free block before an error occurred, that is, then $10^{th}$ block in the example sequence. In response, therefore, the transmitting station is caused to re-transmit the latter 90 blocks of data in the sequence, even though the latter 85 of those already were transmitted and received without errors. Thus, data bandwidth is consumed in the re-transmitting of that data.

In the Cumulative with Selective ACK format, a receiving station transmits a feedback message to a transmitting station that includes both: (1) an identifier (e.g., sequence number) of the last data block that was satisfactorily received in a sequence of blocks; and (2) one or more (up to four) 16-bit bitmaps, where each bit in a bitmap corresponds to a respective block of data received by the receiving station and indicates, by the binary value, whether the block was either acceptable or in error, where these described 16 data blocks follow the last identified block in item (1), above. In other words, this format combines the two formats detailed above. Note that the Cumulative with Selective ACK format has at least one drawback if it is used in a sequence where the error block is early in the sequence in that the bitmap therefore will only characterize the next 16 blocks following the last of the properly-received blocks in the sequence.

In the Cumulative ACK with Block Sequence ACK format, a receiving station transmits a feedback message to a transmitting station that includes an indication of the sequence number of the last in sequence correctly received block and up to 4 ACK Maps. Each ACK map includes an indication of the type of sequence used and either 14 bits in a 2 sequence variant or 15 bits in a 3 sequence variant. For either variant, these bits includes a Sequence Ack Map ("SAM"), where the Map is 2 bits for the 2 sequence variant and the Map is 3 bits for the 3 sequence variant. The state of each bit in the map indicates that a sequential number of blocks, corresponding to that bit, were received either as all valid (i.e., without error) or all invalid. For example, a binary value of 0 indicates that a corresponding sequential number of blocks were invalid, and a binary value of 1 indicates that a corresponding sequential number of blocks were valid. Thus, for the 2 sequence variant, a SAM of 01 indicates that a first sequence length $SL_1$ of sequential blocks, corresponding to the first SAM bit value of 0, were received as invalid, and a second sequence length $SL_2$ of sequential blocks, corresponding to the second SAM bit value of 1, were received as valid. Note that the first and second sequence lengths $SL_1$ and $SL_2$ are also included in the message format. Particularly, in addition to the SAM, the remaining 12 bits in the message identify two six-bit binary numbers, where each binary number thereby indicates the values of $SL_1$ and $SL_2$ (i.e., a value up to 31 due to the six bits). Continuing the previous example with the SAM of 01, assume also that in the remaining 12 bits the first six bits are 000111 (i.e., decimal 7) and the second six bits are 010011 (i.e., decimal 19). Thus, these values respectively indicate that $SL_1=7$ and $SL_2=19$. Accordingly, in combination with the SAM, this message would indicate that the receiver received a sequence of data blocks wherein the first 7 blocks were invalid while the next 19 blocks were valid. The 3 sequence variant of this format is similar, but its SAM includes three bits, each corresponding to a respective 4-bit sequence length $SL_1$, $SL_2$, and $SL_3$ in the remaining 12 bits. Thus, for the 3 sequence variant, the remaining 12 bits in the message provide three 4-bit numbers that each respectively indicate one of the values of $SL_1$, $SL_2$, and $SL_3$. Consider then an example of a SAM of 010, and assume also that in the remaining 12 bits the first four bits are 0011 (i.e., decimal 3, that is, $SL_1=3$), the second four bits are 1001 (i.e., decimal 9, that is, $SL_2=9$), and the third four bits are 0111 (i.e., decimal 7, that is, $SL_3=7$). Thus, in combination with the SAM, this message would indicate that the receiver received a sequence of data blocks wherein the first 3 blocks in the sequence were invalid (because the first SAM bit is 0), the next 9 blocks in the sequence were valid (because the second SAM bit is 1), and the next 7 blocks in the sequence were invalid (because the third SAM bit is 0).

It is recognized in connection with the preferred embodiments that while the Cumulative ACK with Block Sequence ACK format has benefits in reporting upon certain data block sequences, it too may be unnecessarily limited in that it may be improved upon as detailed later. By way of example at this point, note that the 2 sequence variant of this format is limited in that the each sequence length $SL_1$, is limited by the six-bit identifier, where therefore each such identifier is able to identify only up to 63 data blocks (i.e., $2^6-1=63$), and therefore the format in its entirety is limited to describe no more than 126 data blocks (i.e., $SL_1+SL_2 \leq 126$). Further, note that the 3 sequence variant of this format is limited in that the each sequence length $SL_x$ is limited by the four-bit identifier, where therefore each such identifier is able to identify only up to 15 data blocks (i.e., $2^4-1=15$), and therefore the format in its entirety is limited to describe no more than 45 data blocks (i.e., $SL_1+SL_2+SL_3 \leq 45$).

Given the preceding, the preferred embodiments seek to improve upon the prior art, as demonstrated below.

BRIEF SUMMARY OF THE INVENTION

In the preferred embodiment, there is a method of performing wireless communications. The method receives at a receiving unit a sequence of data blocks from a transmitting unit. The method also identifies at the receiving unit a first number of invalid sequential data blocks in the sequence and a second number of valid sequential data blocks in the sequence. The method also communicates from the receiving unit a wireless message to the transmitting unit. The wireless message comprises a first field that specifies the first number and a second field that specifies the second number—the encoding of the first field is operable to specify a different maximum then an encoding of the second field.

Other aspects are also disclosed and claimed.

DETAILED DESCRIPTION OF THE INVENTION

The preferred embodiments are described in connection with a preferred implementation into a base station or subscriber station in a "WiMAX" wireless broadband network, operating under the IEEE 802.16 standard, as it is contemplated that this implementation is especially beneficial when realized in such an environment. However, it is also contemplated that other preferred embodiments may be created to provide similar important benefits in other types of networks, particularly those in which an ARQ format is established with a number N of block indicators corresponding to respective N sequence length indications. Accordingly, it is to be understood that the following description is provided by way of example only, and is not intended to limit the true inventive scope as claimed.

Figure 1:
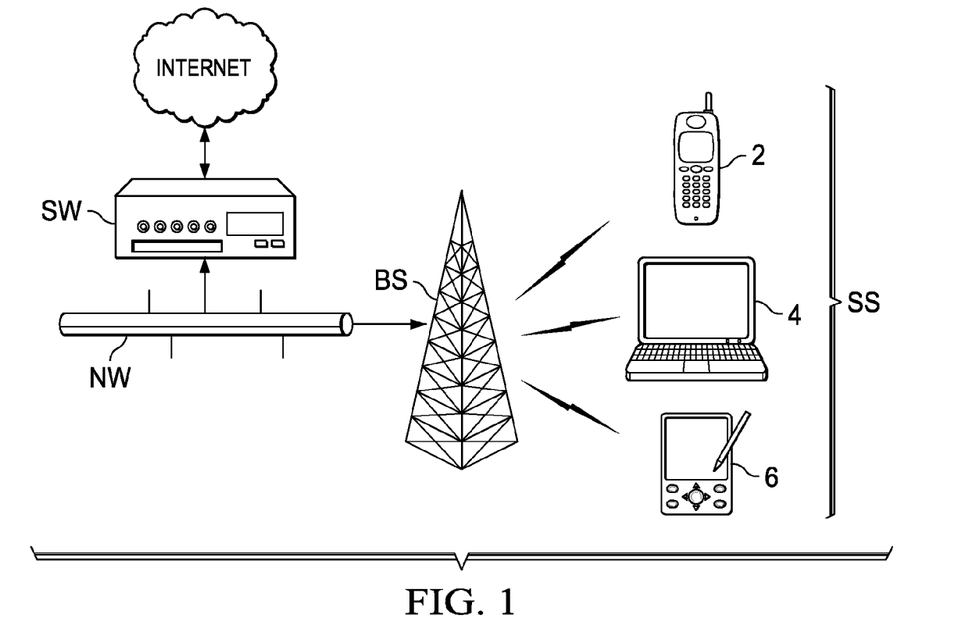
FIG. 1 is an electrical diagram, in block form, of a wireless broadband metro area network into which the preferred embodiments may be implemented by way of example.

FIG. 1 illustrates a wireless metro area network (MAN) into which the preferred embodiments are implemented. In the network of FIG. 1, a base station BS corresponds to infrastructure at a fixed location, including an antenna and communication circuitry. Communications occur between base station BS and various mobile stations or subscriber stations SS in the vicinity of base station BS. It is contemplated, in the MAN context as illustrated in FIG. 1, that wireless communications between base station BS and subscriber stations SS can be carried over distances ranging up to several miles. The particular performance and distance over which such communications can be carried out will vary, of course, with atmospheric conditions and with the nature of various attenuators (e.g., buildings, mountains) in the vicinity of base station BS.

As noted above and as evident from FIG. 1, base station BS includes an antenna tower or other antenna structure suitable for supporting communications over its coverage area. Base station BS also includes circuitry (not shown) and other support equipment suitable for communicating over backbone network NW into a wide area network (WAN) context. The example of FIG. 1 illustrates switch equipment SW as residing on backbone network NW, through which base station BS is able to communicate to and from the global Internet and with various other devices and network elements coupled to the Internet, via Internet Protocol (IP) communications and the like.

In the example of FIG. 1, it is contemplated that many types of subscriber stations SS may communicate over the wireless MAN supported by base station BS. A smartphone 2 is one example of subscriber station SS, and in this example includes not only cellular telephone connectivity, but also circuitry for connecting to the wireless MAN supported by base station BS; in this manner, smartphone 2 can operate using such communications services as Internet web browsing, the sending and receipt of email messages, and other services such as Voice over Internet Protocol (VoIP) telephony. It is contemplated that smartphone 2 is thus capable of both cellular and wireless broadband communications, and supporting services such as those contemplated according to so-called "3G" or "LTE" (Long Term Evolution) wireless services. Another type of subscriber station SS that may communicate in the network of FIG. 1 is illustrated by a laptop computer 4, by way of a WiMAX or wireless broadband network adapter; laptop computer 4 of course includes the circuitry, display, and software capability for carrying out services such as Internet web browsing, email communications, and VoIP telephony and the like. Similarly, a personal digital assistant (PDA) 6 in FIG. 1 represents handheld wireless broadband capable devices, including not only PDAs but also palmtop or tablet computers, and the like, such devices also supporting the services contemplated in connection with wireless broadband connectivity.

Figure 2:
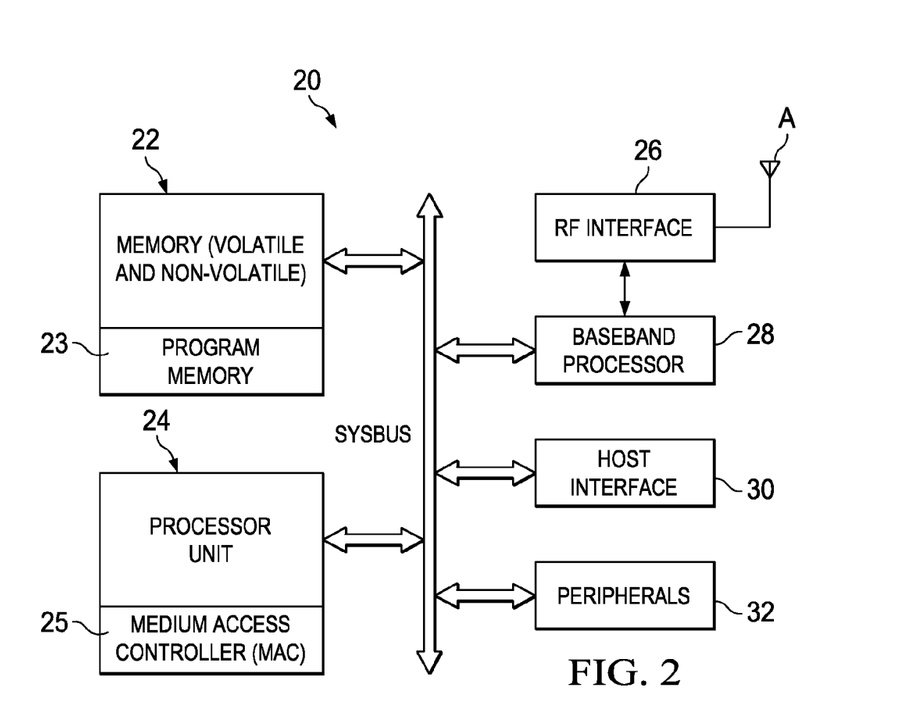
FIG. 2 is an electrical diagram, in block form, of a base station or subscriber station in the network of FIG. 2, constructed according to the preferred embodiment of the invention.

FIG. 2 illustrates the construction of network station 20 according to a preferred embodiment. This generalized construction of network station 20 as shown in FIG. 2 is contemplated to be applicable to either base station BS or to subscriber station SS, such as smartphone 2, laptop computer 4, PDA 6, or a wireless broadband adapter or function within such subscriber station devices. In this context, therefore, network station 20 may be representative of the entire device or system, or instead of only an adapter, card, or particular built-in or added function in base station BS or such subscriber station SS. Furthermore, those skilled in the art having reference to this specification will understand that the architecture illustrated in FIG. 2 is presented by way of example only, and that many variations to this architecture alternatively may be used to realize network station 20.

Network station 20 is contemplated to be implemented by way of a programmable digital computing system. As such, network station 20 includes a processor unit 24, which may be implemented as a general purpose or application-specific processor, as determined by the system designer, capable of executing instructions in computer programs to carry out the overall processing and functionality of network station 20. In FIG. 2, network station 20 also includes memory 22, preferably including both volatile random access memory (RAM) and also non-volatile memory, for example read-only memory (ROM), flash memory, or some other type of programmable non-volatile memory. It is contemplated that at least a portion of memory 22 constitutes program memory 23, for storing instruction sequences or software routines that are executable by processor unit 24 in its operation. Typically, program memory 23 will be realized by non-volatile memory within memory 22 in one way or another, in which case the program instructions may be fetched from such non-volatile memory within memory 22 serving as program memory. Alternatively, some sort of boot-loading or other software management function may be executed on startup of network station 20, so that the program instructions (and thus program memory 23) are deployed at least in part into volatile memory within memory 22. Of course, the various portions of memory 22 (data memory and program memory; volatile and non-volatile memory; etc.) may be realized in the same memory address space or in different memory address spaces, according to the particular architecture. In the example of FIG. 2, processor unit 24 accesses memory 22 via system bus SYSBUS. A portion of processor unit 24 in network station 20 according to the preferred embodiments is shown in FIG. 2 as corresponding to medium access controller (MAC) 25. MAC controller 25 may be a separate integrated circuit, or separate processor core, within processor unit 24, or alternatively may be realized by the same processor core of processor unit 24 used to perform various data processing functions within network station 20.

According to a preferred embodiment, a methodology is provided whereby a receiving station (e.g., one of base station BS or any subscriber station SS) receives a sequence of data blocks from a transmitting station (e.g., also one of base station BS or any subscriber station SS), the receiving station sends an ARQ message back to the transmitting station, and the transmitting station decodes the ARQ message and responds thereto. It is contemplated that various processing circuitry in network station 20 may accomplish this methodology as either the receiving station or the transmitting station by the use of program instructions. Thus, such program instructions may be executed by a MAC controller 25 or such other processing circuitry in network station 20, and in doing so carries out the operations of the preferred embodiments as described later. In this regard, it is contemplated that such program instructions or a portion thereof may be provided to network station 20 by way of computer-readable media, or otherwise stored in program memory 23 such as by way programming program memory 23 during or after manufacture, or provided by way of other conventional optical, magnetic, or other storage resources at those computer resources, or communicated to network station 20 by way of an electromagnetic carrier signal upon which functional descriptive material corresponding to that computer program or portion thereof is encoded.

Other system functions in network station include peripherals 32, shown in FIG. 2 as coupled to system bus SYSBUS, for example including input/output functions such as one or more serial ports, timer circuitry, and the like, as suitable for the particular function of network station 20. Host interface 30 is coupled to system bus SYSBUS, and serves as an interface to a host computer or other system. Host interface 30 is particularly useful if network station 20 is implemented as an adapter to a larger system, such as in the case of base station BS or laptop computer 4. In that case, the adapter of network station 20 would communicate with the host system by way of this host interface 30.

Network station 20 also includes the appropriate circuitry for communicating in a wireless broadband network such as that shown in FIG. 2. In this arrangement, a baseband processor 28, coupled to system bus SYSBUS, may be realized by a digital signal processor or other programmable logic and performs the appropriate encoding and decoding operations, digital filtering, modulation and demodulation, as useful and appropriate for the physical layer requirements of the wireless communications protocol supported by network station 20. An RF interface 26 in network station 20 is preferably realized by the appropriate digital and analog circuitry for driving radio frequency (RF) signals being transmitted, and for receiving RF signals, via antenna A. RF interface 26 communicates with baseband processor 28.

As introduced earlier, according to a preferred embodiment, network station 20 is programmed, for example by way of instructions stored in program memory 23 and executable by MAC controller 25, to perform different operations when either:

(1) acting as a receiving station, it:
 (i) receives a sequence of data blocks; and
 (ii) transmits in response an ARQ message back to the transmitting station that transmitted those data blocks; or
(2) acting as a transmitting station, it:
 (i) transmits a sequence of data blocks;
 (ii) in response receives, from the receiving station, an ARQ message that indicates to the transmitting station the need to re-transmit a portion (or all) of the transmitted sequence of data blocks; and
 (iii) decodes the ARQ message and re-transmits the portion, if any, of the already-transmitted sequence based on the indication of the ARQ message.

These aspects as either a receiving station or a transmitting station are detailed below.

In the preferred embodiments, in acting as a receiving station, network station 20 may operate according to any of known methodologies and per known protocols to receive a sequence of data blocks, and then the ARQ response also may be performed in known manners, including those set forth in the IEEE 802-16 formats detailed earlier in this document. Thus, by ways of example, the ARQ response may be any one of (i) Selective ACK; (ii) Cumulative ACK; (iii) Cumulative with Selective ACK; and (iv) Cumulative ACK with Block Sequence ACK. However, attention is directed to the last of those options (i.e., Cumulative ACK with Block Sequence ACK) for sake of better understanding the inventive scope, where one skilled in the art will appreciate the possible implementation and response to any of the others as may be achieved in the prior art. Further, also per the preferred embodiments, when network station 20 operates to transmit a Cumulative ACK with Block Sequence ACK format, it may do so using a novel encoding approach that is also treated in a novel manner by the corresponding receiving station, as further detailed below.

Figure 3:
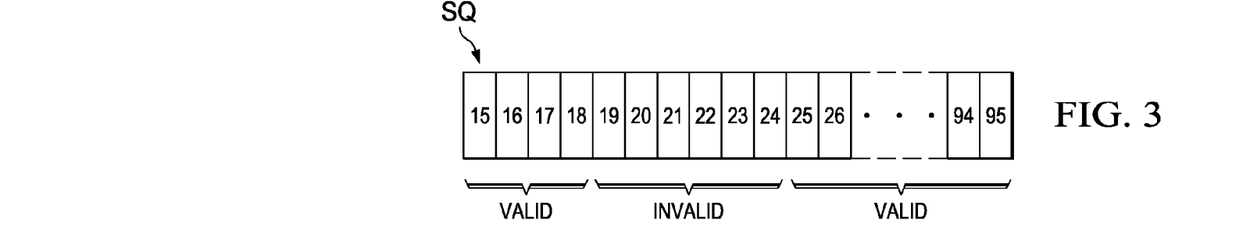
FIG. 3 illustrates an example of a sequence SQ of data blocks, such as may be received by network station 20 when operating in a service flow as a receiving station.

FIG. 3 illustrates an example of a sequence SQ of data blocks, such as may be received by network station 20 when operating in a service flow as a receiving station. In the example of FIG. 3, sequence SQ consists of 81 data blocks, shown as a sequence of block 15-95. Further, as indicated by legends in the FIG. 3, data blocks 15-18 and 25-95 are assumed in the example to have been validly received, where data blocks 19-24 are assumed in the example to not have been validly received, where for example the latter could mean the blocks were lost in the wireless communication or otherwise not received as valid data. In any event, it is assumed in the sequence of FIG. 3 that the receiving network station 20 does not have the proper data encoded in data blocks 19-24, and per the general understanding in the ARQ art is desirous of transmitting a message back to the transmitting station that transmitted sequence SQ so as to cause that station to re-transmit the unrecovered data blocks 19-24.

Figure 4:
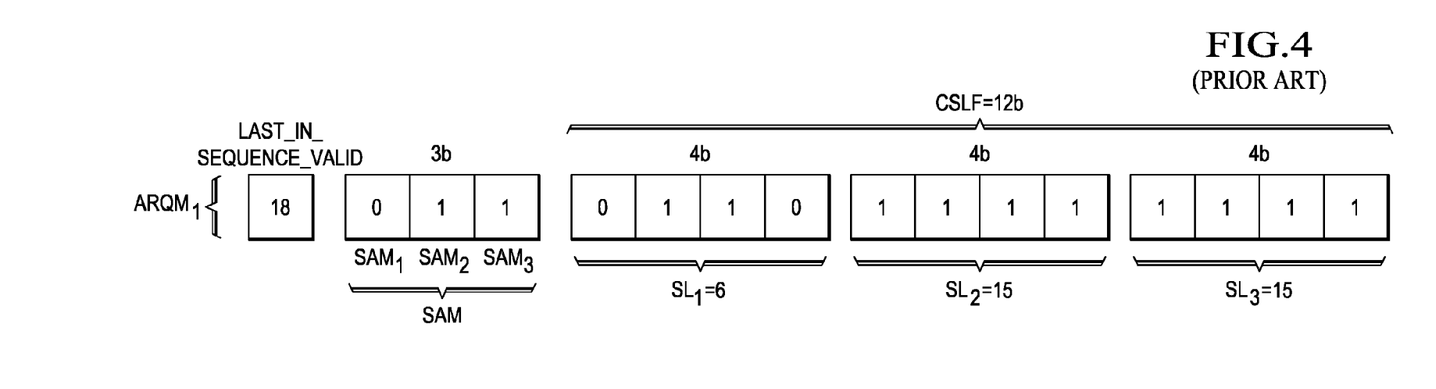
FIG. 4 illustrates, in connection with the example sequence SQ of FIG. 3, a prior art 3-sequence variant of the Cumulative ACK with Block Sequence ACK ARQ message $ARQM_1$.

By way of additional introduction and later contrast to the preferred embodiments, FIG. 4 illustrates, in connection with the example sequence SQ of FIG. 3, a prior art 3-sequence variant of the Cumulative ACK with Block Sequence ACK ARQ message $ARQM_1$ that may be communicated by a station such as network station 20. Message $ARQM_1$ includes a LAST_IN_SEQUENCE_VALID indicator (which under the IEEE 802.16 (WiMAX) standard is referred to as the 'sequence number of the last successfully received block'), a 3-bit Sequence Ack Map ("SAM"), and three 4-bit sequence length indicators $SL_1$, $SL_2$, and $SL_3$ that therefore form a total of 12 bits, that are referred to in general as a combined sequence length field CSLF. As further detailed below, each sequence length indicator $SL_x$ corresponds to a respective one of the three bits in the SAM. Additional details for each of these indicators are provided below.

In message $ARQM_1$, the LAST_IN_SEQUENCE_VALID indicator indicates the last validly received block number in the sequence; thus, since Message $ARQM_1$ is an example in connection with the example of sequence SQ in FIG. 3, then in FIG. 4 LAST_IN_SEQUENCE_VALID indicates that block number 18 was the last valid block received by network station 20 (that was operating as a receiving station) before an invalid block (i.e., block 19) was encountered. Accordingly, when a network station 20 that is operating as a transmitting station receives message $ARQM_1$, it is thereby informed that it should commence re-transmission starting with the next data block (i.e., block 19) following the last validly-received data block in sequence SQ.

In message $ARQM_1$, the state of each SAM bit $SAM_x$ indicates whether the data blocks identified in a respective sequence length $SL_x$ were validly received, and for sake of example a binary value of 0 in the SAM indicates invalid data and a binary value of 1 in the SAM indicates valid data. Thus, $SAM_1=0$, indicating that the number of blocks identified in the corresponding sequence length $SL_1$ are invalid, where recall from FIG. 3 that such invalid blocks are blocks 19-24. Moreover, sequence length $SL_1$ indicates with 4 bits the number of sequential invalid data blocks corresponding to the invalid indicator of $SAM_1$; hence, in FIG. 4, sequence length $SL_1$ indicates a binary value of 0110, which is a decimal six to indicate a total sequence of six invalid data blocks, thereby accurately identifying the number of invalid blocks 19-24 in sequence SQ. However, $SAM_2=1$, indicating that the number of sequential blocks identified in the corresponding sequence length $SL_2$ are valid, where note from FIG. 3 that such valid blocks follow the invalid blocks 19-24 in sequence SQ. Further, sequence length $SL_2$ indicates the maximum number that may be specified by its 4 bits, that is, sequence length $SL_2$ indicates a binary value of 1111, which is a decimal 15, thereby accurately identifying that the 15 data blocks 25-39, following invalid blocks 19-24 in sequence SQ are valid. Similarly, $SAM_3=1$, and its corresponding sequence length $SL_3$ indicates the maximum number of 1111 (i.e., decimal 15) to indicate a total sequence of 15 valid data blocks, thereby accurately identifying that the 15 data blocks 40-54, following valid blocks 25-39, in sequence SQ are valid.

Figure 5:
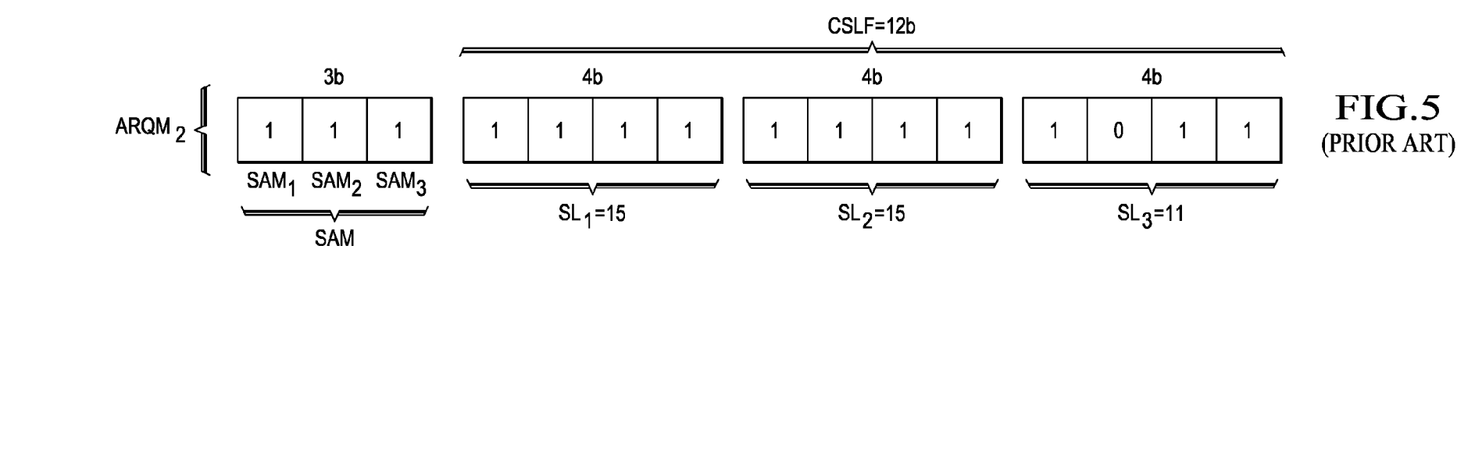
FIG. 5 illustrates a message $ARQM_2$ therefore characterizes the remaining data blocks in sequence SQ that were not characterized by message $ARQM_1$ in FIG. 4.

Given the example of message $ARQM_1$ and sequence SQ, the present inventors have observed that such a sequence demonstrates a key limitation of the 3-sequence variant of the Cumulative ACK with Block Sequence ACK ARQ message. Specifically, note that sequence SQ includes 81 data blocks, but a single Cumulative ACK with Block Sequence ACK ARQ message is insufficient to characterize that entire sequence, as it only characterizes the data through data block 54. Thus, to fully characterize sequence SQ using the 3-sequence variant of the Cumulative ACK with Block Sequence ACK ARQ message, a second prior art ACK map $ARQM_2$ is required to be transmitted from the receiving station to the transmitting station, as shown in FIG. 5. Specifically, message $ARQM_2$ again includes a SAM and the corresponding three 4-bit sequence length indicators $SL_1$, $SL_2$, and $SL_3$. In the example of FIG. 5, message $ARQM_2$ therefore characterizes the remaining data blocks in sequence SQ that were not characterized by message $ARQM_1$ in FIG. 4, that is, message $ARQM_2$ characterizes data blocks 55-95. Since the first 15 of these data blocks (i.e., blocks 55-69) are valid, then in FIG. 5 $SAM_1=1$, and the number of those data blocks are shown in the respective sequence length $SL_1=15$ (decimal). Similarly, since the second 15 of these data blocks (i.e., blocks 70-84) are valid, then in FIG. 5 $SAM_2=1$, and the number of those data blocks are shown in the respective sequence length $SL_2=15$ (decimal). Lastly, since sequence SQ then concludes with 11 remaining valid data blocks (i.e., blocks 85-95), then $SAM_3=1$, and the number of those data blocks are shown in the respective sequence length $SL_3=11$ (decimal). In all events, therefore, for sequence SQ, and for other comparable sequences wherein a considerable length of valid blocks follow a burst of invalid blocks, then multiple messages may be required when implementing the prior art Cumulative ACK with Block Sequence ACK ARQ message.

Figure 6:
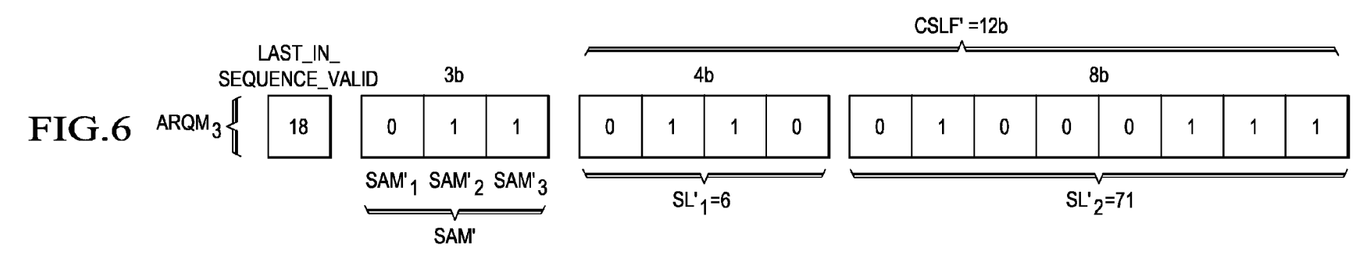
FIG. 6 illustrates, also in connection with the example sequence SQ of FIG. 3, an inventive variant of a Cumulative ACK with Block Sequence ACK ARQ message $ARQM_3$ that would be transmitted if for sequence SQ of FIG. 3.

FIG. 6 illustrates, also in connection with the example sequence SQ of FIG. 3, an inventive variant of a Cumulative ACK with Block Sequence ACK ARQ message $ARQM_3$ that is preferably communicated by a station such as network station 20 when appropriate or efficient to do so. Message $ARQM_3$ in some respects is comparable to message $ARQM_1$ described above, but as now detailed also includes a key difference. Particularly, in the preferred embodiment, the ARQ message (e.g., $ARQM_3$) may characterize a longer sequence of data blocks, and preferably this is achieved by implementing the message ARQM so that its sequence lengths have different maximums. Thus, in contrast where the prior art is necessarily constrained in that each of its sequence lengths are constrained to a same maximum (e.g., specified by four bits), the inventive ARQ message (e.g., $ARQM_3$) is not so constrained and thereby provides various benefits over the prior art.

Turning to FIG. 6 in greater detail, message $ARQM_3$, like message $ARQM_1$ described above, includes a LAST_IN_SEQUENCE_VALID indicator. Further, message $ARQM_3$ includes a 3-bit Sequence Ack Map ("SAM"), and it is indicated as SAM' for sake of distinguishing it in discussion from the prior art SAM but in fact it may be of the same form and include the same data as the prior art. However, message $ARQM_3$ includes two sequence length indicators $SL'_1$ and $SL'_2$, where in the example presented sequence length indicator $SL'_1$ is 4 bits and sequence length indicator $SL'_2$ is 8 bits, for reasons now further explored and that form a total of 12 bits and are referred to in general as a combined sequence length field CSLF'. In the preferred embodiment and as further detailed below, a receiving station that receives the inventive ARQ message (i.e., like message $ARQM_3$) is able to discern that the message is different than that of the prior art and decodes the message in a manner to comprehend that the there are only two sequence length indicators $SL'_1$ and $SL'_2$ (as opposed to three in the prior art of FIGS. 4 and 5) and that each sequence has a different number of bits therein.

From the present example of FIG. 6, the first bit in the SAM' (i.e., SAM'1) corresponds to sequence length indicator $SL'_1$, and because that bit is a binary 0 indicates that the number of data blocks indicated by $SL'_1$ are invalid. Accordingly, in the present example where message $ARQM_3$ also corresponds to the example sequence SQ of FIG. 3, then sequence length indicator $SL'_1$ indicates a binary value of 0111, which is a decimal six to indicate a total sequence of six invalid data blocks, thereby accurately identifying the number of invalid blocks 19-24 in sequence SQ.

From the present example of FIG. 6, because the second and third bits in the SAM' (i.e., $SAM'_2$ and $SAM'_3$) have the same binary value (e.g., 1), they are decoded, as detailed later, to correspond to a single sequence length indicator $SL'_2$, rather than corresponding to two separate and respective sequence lengths (e.g., $SL_2$ and $SL_3$) as in the prior art. More specifically, the valid indication of the second and third bits in the SAM' are decoded to indicate that sequence length indicator $SL'_2$ is to be treated as an 8-bit number, as compared to the different sized 4-bit number provided by sequence length indicator $SL'_1$. As a result, therefore, then the binary number of sequence length indicator $SL'_2$ includes eight binary places, thereby spanning a number between 0 and 255, and can thereby indicate a total number of valid data blocks between 0 and 255. In this regard, in the example of FIG. 6, note that sequence length indicator $SL'_2$=01000111, which when decoded as an 8-bit binary number equals a decimal value of 71, thereby indicating a total of 71 valid data blocks. In returning to sequence SQ of FIG. 3, therefore, note that those 71 valid data blocks are the remaining blocks 25-95 in sequence SQ, which follow the 6 invalid data blocks indicated by $SAM'_1$ and sequence length indicator $SL'_1$. Therefore, one skilled in the art may compare FIG. 6 to FIGS. 4 and 5 to appreciate that the former single FIGURE demonstrates that the preferred embodiment may characterize the entire sequence SQ of FIG. 3 with a single message or ACK map and corresponding bit maps, while the prior art as shown in FIGS. 4 and 5 required twice the messaging (i.e., two messages instead of one, or two ACK maps and corresponding bitmaps) to likewise characterize sequence SQ of FIG. 3. Moreover, note that the preferred embodiment is able to achieve these results without extending the length of the overall message size of the prior art, that is, the combination of the SAM (or SAM') and the sequence length indicators in either case is 15 bits. Clearly, therefore, the preferred embodiment may significantly improve feedback bandwidth and other resources related thereto.

Figure 7:
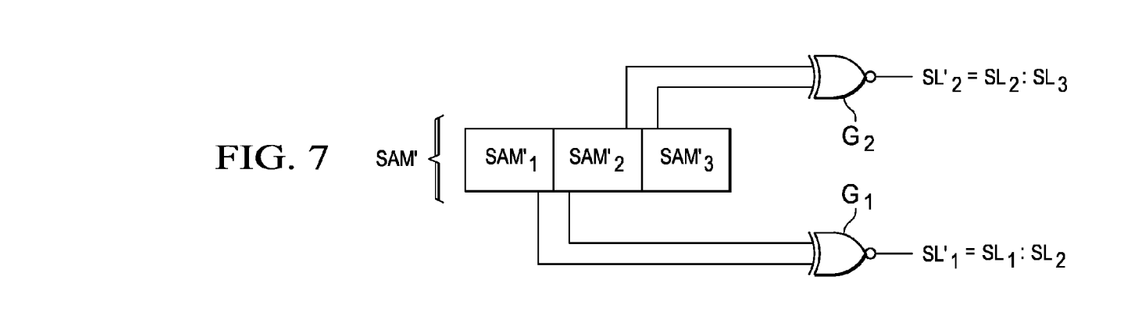
FIG. 7 illustrates in electrical block diagram form the operation of a network station 20 when operating in a service flow as a transmitting station per the preferred embodiment and when receiving a novel Cumulative ACK with Block Sequence ACK ARQ message (e.g., $ARQM_3$).

FIG. 7 illustrates in electrical block diagram form the operation of a network station 20 when operating in a service flow as a transmitting station per the preferred embodiment and when receiving via feedback a novel Cumulative ACK with Block Sequence ACK ARQ message (e.g., $ARQM_3$). By way of introduction, note that FIG. 7 is depicted only to demonstrate the logical methodology and is not intended to suggest a particular hardware or software implementation. Thus, one skilled in the art may implement the methodology described herein using software, hardware, and/or a combination thereof. Looking specifically to the methodology taught by FIG. 7, it illustrates the 3-bit SAM' of such a received message, with its above-introduced data block validity bits $SAM'_1$, $SAM'_2$, and $SAM'_3$. Further, bits $SAM'_1$ and $SAM'_2$ are connected as inputs to an exclusive NOR gate $G_1$, and bits $SAM'_2$ and $SAM'_3$ are connected as inputs to an exclusive NOR gate $G_2$. As indicated in FIG. 7 and further detailed below, if the output of gate $G_1$ is high, then the corresponding network station 20 decodes the received message of which the SAM' is a part so that its sequence length $SL'_1$ is the first 8 bits of the combined sequence length field CSLF' (i.e., corresponding to field $SL_1$ concatenated with field $SL_2$ in the prior art). Alternatively, and as indicated in FIG. 7 and further detailed below, if the output of gate $G_2$ is high, then the corresponding network station 20 decodes the received message of which the SAM' is a part so that its sequence length $SL'_2$ is the last 8 bits of the combined sequence length field CSLF' (i.e., corresponding to field $SL_2$ concatenated with field $SL_3$ in the prior art). Each of these two alternatives is described below.

Perhaps to simplify an understanding of FIG. 7, a first discussion is directed to gate $G_2$, as it corresponds to the preferred embodiment operation of base station 20 as a receiving station for message $ARQM_3$ in FIG. 6. Specifically, recall from FIG. 6 that both $SAM'_2$ and $SAM'_3$ have the same value (i.e., of 1). As known in the logic art, only when two inputs to an exclusive NOR gate are the same, the gate outputs a high value; thus, in FIG. 7, the output of gate $G_2$ is high, thereby causing the receiving station to treat the last 8 bits of combined sequence length field CSLF' as the value of sequence length $SL'_2$, while the value of sequence length $SL'_1$ is the same as the prior art (i.e., the first 4 bits of combined sequence length field CSLF' corresponding to the first combined sequence length field CSLF in the prior art). As a result, the receiving station decodes $SAM'_1$=0 to indicate that the 4-bit number $SL'_1$ of data blocks in the previously-transmitted sequence following LAST_IN_SEQUENCE_VALID are invalid, while the receiving station decodes $SAM'_2$=$SAM'_3$=1 to indicate that the 8-bit number $SL'_2$ of data blocks in the previously-transmitted sequence, and following the $SL'_1$, invalid data blocks, are valid. Thus, in decoding and interpreting $ARQM_3$, the receiving station determines that after LAST_IN_SEQUENCE_VALID, the next 6 data blocks were invalid as indicated by the 4-bit $SL'_1$, while the following 71 data blocks were valid as indicated by the 8-bit $SL'_2$. In response, therefore, the transmitting station re-transmits the 6 invalid data blocks.

Figure 8:
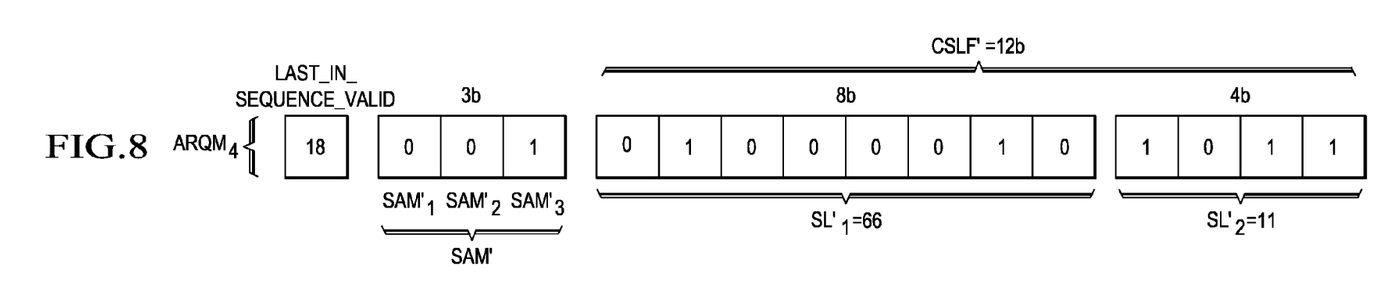
FIG. 8 illustrates an inventive variant of a Cumulative ACK with Block Sequence ACK ARQ message $ARQM_4$ that would be transmitted if for sequence SQ of FIG. 3 its invalid data blocks were blocks 19-84 (instead of 19-24 as shown).

To appreciate an understanding of FIG. 7 as directed to gate $G_1$, FIG. 8 illustrates an inventive variant of a Cumulative ACK with Block Sequence ACK ARQ message $ARQM_4$ that would be transmitted if for sequence SQ of FIG. 3 its invalid data blocks were blocks 19-84 (instead of 19-24 as shown). Thus, message $ARQM_4$ again begins with a LAST_IN_SEQUENCE_VALID value of 18, thereby indicating that data block 18 was the last validly received data block in the received sequence prior to incurring the invalid data block 19. In the present example, therefore, there were 66 invalid data blocks (i.e., blocks 19-84) received after the LAST_IN_SEQUENCE_VALID data block. Hence, in FIG. 8, both $SAM'_1$ and $SAM'_2$ are low, and these cause the output of gate $G_1$ to be high. As a result and as indicated in FIG. 7, the receiving station treats the first 8 bits of combined sequence length field CSLF' as the value of sequence length $SL'_1$, while the value of sequence length $SL'_2$ is treated the same as the prior art (i.e., the last 4 bits of combined sequence length field CSLF' corresponding to the last 4 bits in the combined sequence length field CSLF in the prior art). As a result, the receiving station decodes $SAM'_1$=$SAM'_2$=0 to indicate that the 8-bit number $SL'_1$ of data blocks in the previously-transmitted sequence following LAST_IN_SEQUENCE_VALID are invalid, while the receiving station decodes $SAM'_3$=1 to indicate that the 4-bit number $SL'_2$ of data blocks in the previously-transmitted sequence, and following the $SL'_1$ invalid data blocks, are valid. Thus, in interpreting $ARQM_4$, the receiving station determines that after LAST_IN_SEQUENCE_VALID, the next 66 data blocks were invalid as indicated by the 8-bit $SL'_1$, while the following 11 data blocks were valid as indicated by the 4-bit $SL'_2$. In response, therefore, the transmitting station re-transmits the 66 invalid data blocks.

From the preceding, it may be appreciated that the preferred embodiments provide a method and apparatus for automatic repeat requests (ARQ) from a receiving unit to indicate to a transmitter to re-transmit a number of data units that were not properly received by the receiving unit. The ARQ of the preferred embodiments may be used in addition to other ARQ methodologies to provide considerable and additional flexibility over the prior art. The preferred embodiments permit an ARQ with a number N of validity indicators, wherein each indicator has a respective sequence length indicator, but where the sequence length indicators are of different lengths or are able to specific different maximum values. An example is shown where one sequence length indicator is a 4-bit value and another is an 8-bit value. Naturally, other number of validity indicators and other bit lengths (or bases) are contemplated. Further, the preferred embodiments may be implemented without adding any additional complexity to the message formats. In a WiMAX network, such an approach will be especially useful if there are burst errors in acknowledging a larger number of blocks/packets with lower feedback bandwidth. Indeed, in such a network, the length or number of blocks in a burst error often will be less than 16 blocks, so in the preferred embodiment 4-bits may be used to characterize that length while thereby providing 8 bits to characterize up to 255 valid blocks following the burst error. This is particularly advantageous because for certain high data rate applications, such as content download or streaming media, the sequence of successful blocks following a burst of blocks in error can be potentially on the order of hundreds. Thus, the preferred embodiment may accommodate such cases with less feedback messages than would be required in the prior art and by providing flexibility whereby other message formats may be used for other data error patterns. In addition to the benefits described above, one skilled in the art will appreciate that the preceding discussion is only by way of example and other changes may be made within the inventive scope. For example, other wireless networks may implement the present teachings. As another example, while the preceding demonstrates a one-to-one correspondence between the bits in the SAM and the sequence length indicators, a different indicator may be used to demonstrate that the sequence length indicators are of different sizes (or have different maximums). Thus, these considerations and the described embodiments also demonstrate that while the present embodiments have been described in detail, various substitutions, modifications or alterations could be made to the descriptions set forth above without departing from the inventive scope, as is defined by the following claims.

The invention claimed is:

1. A method of performing wireless communications, comprising:
   receiving at a receiving unit a sequence of data blocks from a transmitting unit;
   determining a last valid data block as a cumulative value;
   identifying at the receiving unit a first number of invalid sequential data blocks in the sequence after the last data block corresponding to the cumulative value;
   identifying at the receiving unit a second number of valid sequential data blocks in the sequence; and
   communicating from the receiving unit a wireless message to the transmitting unit, the wireless message comprising;
   the cumulative value;
   a first field that specifies the first number after the last data block corresponding to the cumulative value; and
   a second field that specifies the second number,
   wherein an encoding of the first field within an ACK type that uses the cumulative value is operable to specify a different maximum than an encoding of the second field within the same ACK type that uses the cumulative value,
   wherein the second number of valid sequential data blocks follows the first number of invalid sequential data blocks in the sequence within the same ACK type that uses the cumulative value,
   wherein a sequence of indicators within the same ACK type that uses the cumulative value determines respective lengths of the first and second fields, wherein the sequence of indicators are not themselves the first and second fields.

2. The method of claim 1:
   wherein the first field and the second field are encoded using binary numbers; and
   wherein the first field consists of a different number of bits than the second field.

3. The method of claim 2 wherein one of the first field and the second field consists of 4 bits and the other of the first field and the second field consists of 8 bits.

4. The method of claim 3:
   wherein the message further comprises a map;
   wherein the map comprises at least one indicator corresponding to each of the first field and the second field; and
   wherein the indicator indicates whether data in the corresponding first or second field was validly received.

5. The method of claim 4 wherein a sequence of the indicators determines respective lengths of the first and second fields.

6. The method of claim 1 wherein one of the first field and the second fields consists of 4 bits and the other of the first field and the second fields consists of 8 bits.

7. The method of claim 1:
   wherein the message further comprises a map;
   wherein the map comprises at least one indicator corresponding to each of the first field and the second field; and
   wherein the indicator indicates whether data in the corresponding first or second field was validly received.

8. A method of performing wireless communications, comprising:
   receiving a wireless message by a transmitting unit, the wireless message comprising;
   determining a last valid data block as a cumulative value;
   a first field that specifies the first number after the last data block corresponding to the cumulative value and a second field that specifies the second number,
   wherein an encoding of the first field within the ACK type that uses the cumulative value is operable to specify a different maximum than an encoding of the second field within the same ACK type that uses the cumulative value;
   wherein the second number of valid sequential data blocks follows the first number of invalid sequential data blocks in the sequence; and
   re-transmitting, from the transmitting unit, the cumulative value, the first number of invalid sequential data blocks, and the second number of sequential data blocks,
   wherein a sequence of indicators determines respective lengths of the first and second
   wherein a sequence of the indicators determines respective lengths of the first and second field, wherein the sequence of indicators are not themselves the first and second fields.

9. The method of claim 1 wherein the first field and the second field comprise are part of a plurality of N fields, where each field in the N fields is operable to indicate whether a respective set of sequential data blocks in the sequence is valid.

10. The method of claim 9 wherein N equals two.

11. The method of claim 9 wherein N exceeds two.

12. A wireless communications device, comprising:
   circuitry for receiving a sequence of data blocks from a transmitting unit;
   circuitry for determining the last valid data block as a cumulative value;
   circuitry for identifying a first number of invalid sequential data blocks in the sequence after the last data block corresponding to the cumulative value;
   circuitry for identifying a second number of valid sequential data blocks in the sequence; and
   circuitry for communicating a wireless message to the transmitting unit, the wireless message comprising:

a first field that specifies the first number after the last data block corresponding to the cumulative value and a second field that specifies the second number, wherein an encoding of the first field is within an ACK type is operable to specify a different maximum than an encoding of the second field within an ACK type, wherein the second number of valid sequential data blocks follows the first number of invalid sequential data blocks in the sequence, wherein the sequence of indicators are not themselves the first and second fields.

13. The device of claim 12:

wherein the first field and the second field are encoded using binary numbers; and wherein the first field consists of a different number of bits than the second field.

14. The device of claim 13 wherein one of the first field and the second field consists of 4 bits and the other of the first field and the second field consists of 8 bits.

15. The device of claim 14:

wherein the message further comprises a map;

wherein the map comprises at least one indicator corresponding to each of the first field and the second field; and wherein the indicator indicates whether data in the corresponding first or second field was validly received.

16. The device of claim 12 wherein a sequence of the indicators determines respective lengths of the first and second fields.

17. The device of claim 12 wherein one of the first field and the second fields consists of 4 bits and the other of the first field and the second fields consists of 8 bits.

18. The device of claim 12:

wherein the message further comprises a map;

wherein the map comprises at least one indicator corresponding to each of the first field and the second field; and wherein the indicator indicates whether data in the corresponding first or second field was validly received.

19. The device of claim 12 wherein a sequence of the indicators determines respective lengths of the first and second fields.

20. The device of claim 12 wherein the first field and the second field comprise are part of a plurality of N fields, where each field in the N fields is operable to indicate whether a respective set of sequential data blocks in the sequence is valid.

21. The device of claim 20 wherein N equals two.

22. The device of claim 20 wherein N exceeds two.

23. The method of claim 8 wherein the first field and the second field comprise are part of a plurality of N fields, where each field in the N fields is operable to indicate whether a respective set of sequential data blocks in the sequence is valid.

24. The method of claim 9 wherein N equals two.

25. The method of claim 9 wherein N exceeds two.

* * * * *